(12) United States Patent
Smith et al.

(10) Patent No.: US 9,083,233 B2
(45) Date of Patent: Jul. 14, 2015

(54) DYNAMIC BREAK AND DISTORTION FILTER

(75) Inventors: David Smith, Daleville, VA (US); Robert Gregory Wagoner, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 898 days.

(21) Appl. No.: 13/253,524

(22) Filed: Oct. 5, 2011

(65) Prior Publication Data

US 2013/0088080 A1    Apr. 11, 2013

(51) Int. Cl.

| | |
|---|---|
| H02J 1/10 | (2006.01) |
| H02J 3/38 | (2006.01) |
| H02M 7/44 | (2006.01) |
| H02M 7/68 | (2006.01) |
| H02M 1/12 | (2006.01) |
| H02M 1/32 | (2007.01) |
| H02M 7/539 | (2006.01) |

(52) U.S. Cl.
CPC ............... *H02M 1/126* (2013.01); *H02M 1/32* (2013.01); *H02M 7/539* (2013.01); *H02J 2003/388* (2013.01)

(58) Field of Classification Search
None
See application file for complete search history.

(56) References Cited

U.S. PATENT DOCUMENTS

| 6,208,537 B1 | 3/2001 | Skibinski et al. | |
|---|---|---|---|
| 2004/0008095 A1* | 1/2004 | Siavash | 333/168 |
| 2006/0267560 A1 | 11/2006 | Rajda et al. | |
| 2012/0068655 A1 | 3/2012 | Inuduka et al. | |
| 2013/0088080 A1* | 4/2013 | Smith et al. | 307/43 |

FOREIGN PATENT DOCUMENTS

| EP | 2328262 A2 | 6/2011 |
|---|---|---|
| WO | 2011021485 A1 | 2/2011 |

OTHER PUBLICATIONS

PCT Search Report and Written Opinion dated Jan. 2, 2014 from corresponding Application No. PCT/US2012/058217.

* cited by examiner

*Primary Examiner* — Jared Fureman
*Assistant Examiner* — Aqeel Bukhari
(74) *Attorney, Agent, or Firm* — Sutherland Asbill & Brennan LLP

(57) ABSTRACT

Systems, methods, and apparatus for providing a dynamic break and distortion filter. In one embodiment, an apparatus can include an inverter providing alternating current (AC) power at one of a first and second chopping frequency and a filter. The filter can include an input port receiving the AC power and an output port providing output power by selectively passing the AC power from the input port to the output port. The filter may further include an inductor electrically connected to one of the input port and output port and a capacitor electrically connected to the inductor and to a resistor, wherein current does not substantially flow through the inductor and capacitor at the first chopping frequency and does substantially flow through the inductor and capacitor at the second chopping frequency, and wherein the AC power with the second chopping frequency is dissipated in the resistor.

14 Claims, 4 Drawing Sheets

DYNAMIC BREAK AND DISTORTION FILTER

FIELD OF THE INVENTION

This invention generally relates to power converters, and in particular to combined dynamic breaks and distortion filters for dissipating power from a power converter when the power converter cannot deliver power to a load or a power grid.

BACKGROUND OF THE INVENTION

Power converters are used to convert power from direct current (DC) power sources to alternating current (AC) power output for use on local loads or for delivery to a power grid. Such power converters are instrumental in applications such as for providing AC power from DC distributed power sources like photovoltaic (PV) cells. With an increased societal focus on anthropogenic environmental degradation, particularly in relation to green house gas (GHG) and certain other emissions, there has been an increased trend towards distributed renewable power generation. For example, in recent years, there has been a steep increase in the number of homes and businesses that have installed roof top solar cell arrays that generate power to power a home or business and also provide excess power to the power grid. Such distributed power generation sources may require power converters that are efficient, inexpensive, reliable, and have a minimal form factor.

In distributed generation or point of use generation of power, it is sometimes necessary to temporarily not provide power to the power grid from the distributed generation source. For example, such a situation may arise if there is a temporary drop in the voltage of one or more phases of the power grid, a condition that is sometimes referred to as low voltage ride through (LVRT). Another example of when it may be desirable to temporarily not provide power from a distributed generation source to a power grid may be when a phase jump occurs on the power grid. When a condition arises where power from a distributed generation source cannot be supplied to the power grid, it may be necessary to dissipate power from the power source within the power converter.

Conventional power converters may include a dynamic break to dissipate power temporarily from a power source during times when power cannot be delivered to the power grid. Such dynamic breaks may include a solid state switch that can be gated to apply a shunt resistor to dissipate power either at the input of the inverter or at the output of the inverter of the power converter. Therefore, conventional dynamic breaks in power converters may require additional active devices and associated control mechanisms to dissipate power when power cannot be provided to the power grid from the power converter.

BRIEF SUMMARY OF THE INVENTION

Certain embodiments of the invention can provide systems, methods, and apparatus for an improved dynamic break for a power converter. Embodiments of the invention can include providing a dynamic break and distortion filter. Embodiments of the invention can include combined dynamic breaks and distortion filters for dissipating power from a power converter when the power converter cannot deliver power to a load or a power grid.

In one embodiment, an apparatus can include an inverter providing alternating current (AC) power at one of a first and second chopping frequency and a filter. The filter can include an input port receiving the AC power and an output port providing output power by selectively passing the AC power from the input port to the output port. The filter may further include an inductor electrically connected to one of the input port and output port and a capacitor electrically connected to the inductor and to a resistor, wherein current does not substantially flow through the inductor and capacitor at the first chopping frequency and does substantially flow through the inductor and capacitor at the second chopping frequency, and wherein the AC power with the second chopping frequency is dissipated in the resistor.

In another embodiment, a method can include providing input power via an input port at one of a first and second chopping frequency and selectively providing output power via an output port. The method can further include passing greater current through an inductor and capacitor at the second chopping frequency than at the first chopping frequency and dissipating more input power in a resistor if the input power is at the second chopping frequency than at the first chopping frequency, wherein the chopping frequency of the input power is selectable.

In yet another embodiment, a converter system can include at least one power source providing power to a boost converter providing direct current (DC) power, an inverter converting the DC power to alternating current (AC) power with a chopping frequency at one of a first and second frequency, wherein the chopping frequency can be selected, and, a combined dynamic break and distortion filter selectively providing the AC power to an electrical grid. The combined dynamic break and distortion filter can include an input port receiving the AC power, an output port selectively providing output power to the grid by selectively passing the input power from the input port to the output port, an inductor electrically connected to one of the input port and output port, and a capacitor electrically connected to the inductor and to a resistor. Current may not substantially flow through the inductor and capacitor if the AC power has the first chopping frequency and may substantially flow through the inductor and capacitor if the AC power has the second chopping frequency, and the AC input power with the second chopping frequency component may be dissipated in the resistor.

Other embodiments, features, and aspects of the invention are described in detail herein and are considered a part of the claimed inventions. Other embodiments, features, and aspects can be understood with reference to the following detailed description, accompanying drawings, and claims.

BRIEF DESCRIPTION OF THE FIGURES

Reference will now be made to the accompanying tables and drawings, which are not necessarily drawn to scale, and wherein.

DETAILED DESCRIPTION OF EMBODIMENTS OF THE INVENTION

Embodiments of the invention are described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide apparatus, systems, and methods for an improved dynamic break for a power converter. Such improvements may entail, for example, implementing the dynamic break without any additional active devices or power electronics, such as insulated gate bipolar transistors (IGBTs) or control apparatus associated therewith. Further improvements may include a combined dynamic break and distortion filter using only passive elements resulting in a reduced form factor and cost for the power converter. In one aspect, the functions of a dynamic break can be implemented by changing the chopping frequency of the inverter from a nominal chopping frequency to a chopping frequency higher than the nominal chopping frequency when power needs to be dissipated locally at the power converter. Additionally, the power converter may include a power dissipation resistor downstream of a highpass filter, such that greater power is dissipated in the power dissipation resistor at a higher chopping frequency than at the nominal chopping frequency.

Example embodiments of the invention will now be described with reference to the accompanying figures.

Figure 1:
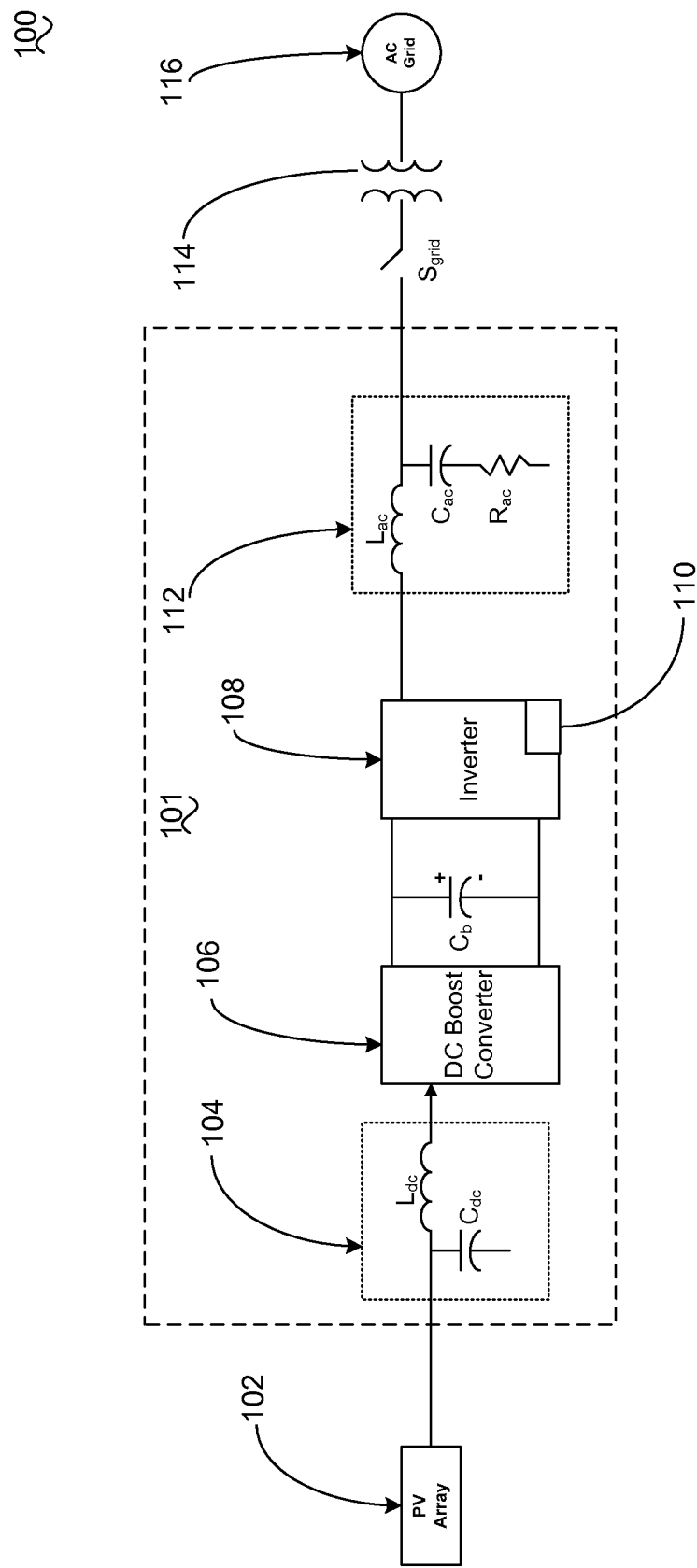
FIG. 1 is a block diagram representation of a conventional power system including an inverter and distortion filter.

Referring now to FIG. 1, a conventional power system 100 is shown. The power system 100 can include a power converter 101, a DC power supply such as a photovoltaic (PV) array 102, a switch $S_{grid}$, and a coupling 114 to a power grid 116. The power converter 101 can include a DC input filter 104, electrically connected to and receiving power from the DC power supply 102, that can be further electrically connected to a DC boost converter 106. The DC boost converter 106 can be connected to an inverter 108 that outputs AC power to an AC filter 112 with a capacitor $C_b$ shunted from the power to ground between the DC boost converter 106 and the inverter 108. The inverter 108 may further include an inverter controller 110 or inverter regulator for generating control signals for the operation of the inverter 108 and for controlling the output of the inverter 108. The output of the AC filter 112 can be electrically connected by a coupling 114 to a power grid 116 via a switch $S_{grid}$.

Although, the DC power source is illustrated as a PV array 102, it can, in other embodiments, be any DC power source including, but not limited to, a photovoltaic cell, a fuel cell, and electrolytic cell, or combinations thereof. As a further embodiment, the power source can be a non-DC power source, such as from wind harvesting, water harvesting, or solar-thermal (solar concentrator) sources. Additional power sources can include a rectified turbine-generator output where the turbine is driven using any variety of known methods including, but not limited to, burning of fossil fuels and other hydrocarbons, nuclear, hydroelectric, or combinations thereof.

The DC input filter 104 can include an inductor $L_{dc}$ and a capacitor $C_{dc}$. The inductor $L_{dc}$ and capacitor $C_{dc}$ may be appropriately sized to filter out high frequency components from the DC power source 102. The DC input filter 104 may also be implemented by any known alternative configuration other than the LC configuration shown. One purpose of the DC input filter 104 can be to prevent current with the chopping frequency of the DC boost converter 106 to flow to the power source 102 and thereby disrupt the operation of the power source 102.

One purpose of the DC boost converter 106 may be to step up DC voltage. In other words, the DC boost converter 106 may accept power at a certain DC input voltage and output the power at a voltage greater than the DC input voltage.

One purpose of the capacitor $C_b$ may be to filter out any high frequency components at the output of the DC boost converter 106, prior to the signal being provided to the inverter 108. The output of the DC boost converter 106 is often referred to as a DC bus. Therefore, the capacitor $C_b$ may be shunted across the DC bus to provide DC power with a boosted voltage to the inverter 108 and the inverter 108 can convert the DC power to AC power at its output.

The AC output power of the inverter 108 can be controlled by the inverter controller 110. In one aspect, the inverter controller 110 may be able to receive a signal and based upon the signal be able to change a chopping frequency of the inverter 108. The chopping frequency, in one aspect can be the frequency at which the constituent switches (not shown) of the inverter 108 are modulated. As an example, the inverter controller 110 may be able to change the chopping frequency of the inverter from an example nominal frequency of about 2 kHz to an example alternate frequency of about 4 kHz. The output of the inverter 108 may provide AC power output that has spectral power at the inverter 108 chopping frequency and harmonics thereof. In one aspect, the inverter controller 110 may provided one or more modulating signals or control signals for the constituent switches (not shown) of the inverter 108. The one or more modulating signals can be, for example, pulse width modulation (PWM) signals. Furthermore, each of the modulating signals may have a frequency of the chopping frequency of the inverter 108.

The AC filter 112 may include an inductor $L_{ac}$, a capacitor $C_{ac}$, and a resistor $R_{ac}$. One purpose of the AC filter 112, also referred to as a distortion filter, may be to condition the output power of the inverter 108 to filter out any high frequency components from the inverter 108 output such as the chopping frequency of the inverter 108, as well as the harmonics of the chopping frequency.

In one aspect, the AC filter 112 may receive power from the output of the inverter 108 with relatively strong spectral components at the chopping frequency and may output power with relatively weaker power at the chopping frequency. In another aspect, the AC filter 112 may receive AC power from the inverter 108 with spectral output at several frequencies, including the chopping frequency, and output AC power substantially at a single fundamental frequency. The fundamental frequency may be relatively lower than the chopping frequency. For example, the fundamental frequency may be about 60 Hz and the chopping frequency may be about 2 kHz.

The switch $S_{grid}$ may selectively disconnect the power from the inverter 108 to the power grid 116. When $S_{grid}$ is closed, AC power from the inverter 108 may be supplied to the power grid 116 via the coupling 114.

Figure 2:
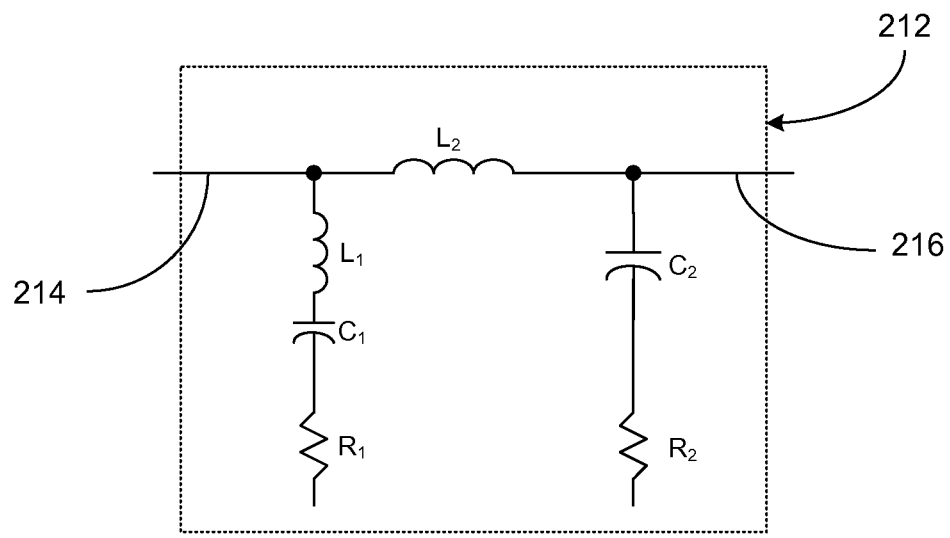
FIG. 2 is a circuit diagram representation of an example dynamic break and distortion filter according to an embodiment of the invention.

Referring now to FIG. 2, an example combined dynamic break and distortion filter 212 is described. The combined dynamic break and distortion filter 212 can replace the AC filter 112 within the power converter 101 circuit topology of FIG. 1. The combined dynamic break and distortion filter 212 can include an inductor $L_1$, a capacitor $C_1$, and a resistor $R_1$. The inductor $L_1$, capacitor $C_1$, and resistor $R_1$ may be connected in series and further connected to an input port 214 of the combined dynamic break and distortion filter 212. The combined dynamic break and distortion filter 212 can further include a second inductor $L_2$, a second capacitor $C_2$, and a second resistor $R_2$. The second inductor $L_2$ can be electrically connected to both the input port 214 and an output port 216 of the combined dynamic break and distortion filter 212. The second capacitor $C_2$ can be connected to both the output port 216 and the second resistor $R_2$. In one embodiment the resistance of resistor $R_1$ is relatively greater than the resistance of the second resistor $R_2$.

As a non-limiting example, the inductor $L_1$ may have a value in the range of about 100 to 300 µH, the capacitor $C_1$ may have a value in the range of about 100 to 1000 µF, the resistor $R_1$ may have a value in the range of about 0.5 to 10 Ω, and the second resistor $R_2$ may have a value in the range of about 1 to 100 mΩ.

During operation, power from the inverter 108 can be received by the combined dynamic break and distortion filter 212. As discussed above in conjunction with FIG. 1, the power from the inverter 108 can have various spectral components, including power at the chopping frequency of the inverter 108. Furthermore, the chopping frequency of the inverter 108 may be selectable between at least a first and second frequency. If a first chopping frequency is selected for the operation of the inverter 108 and therefore power is received at the combined dynamic break and distortion filter 212 input port 214 with power at the first chopping frequency, the associated current may be blocked by the combination of the inductor $L_1$ and the capacitor $C_1$. In other words, when power is received at the input port 214 that has been provided by the inverter 108 operating at the first chopping frequency, the combination of the inductor $L_1$ and the capacitor $C_1$ may operate as a filter to prevent substantial current from flowing to the resistor $R_1$. As a result, when the inverter controller 110 controls the inverter 108 to operate at the first chopping frequency to provide power to the combined dynamic break and distortion filter 212, the resistor $R_1$ may not substantially dissipate any power.

When the inverter 108 is operated at the first chopping frequency, the combined operation of the second inductor $L_2$, the second capacitor $C_2$, and the second resistor $R_2$ may be similar to that of inductor $L_{ac}$, a capacitor $C_{ac}$, and a resistor $R_{ac}$ of the AC filter 112 of the power converter 101 of FIG. 1. In other words, the function of the second inductor $L_2$, the second capacitor $C_2$, and the second resistor $R_2$ may provide smoothing of the power output from the inverter 108 and provide AC power at substantially a fundamental frequency. Furthermore, the relative values of the inductance of the second inductor $L_2$, the capacitance of second capacitor $C_2$, and resistance of second resistor $R_2$ may be selected to provide AC power at the output port 216 of the combined dynamic break and distortion filter 212 that does not substantially have any spectral components at the chopping frequency. It should be noted that during operation at the first chopping frequency some power may be dissipated at the second resistor $R_2$.

In one aspect, some power provided to the combined dynamic break and distortion filter 212 at the input port 214 may be dissipated in the second resistor $R_2$. The remaining power may substantially be provided at the output port 216 at the fundamental frequency.

In one embodiment, the values of the second inductor $L_2$, the second capacitor $C_2$, and the second resistor $R_2$ may be substantially equivalent to the values of the inductor $L_{ac}$, the capacitor $C_{ac}$ and the resistor $R_{ac}$ of the AC filter 112 of FIG. 1. In other embodiments, the values of the inductor $L_1$, the capacitor $C_1$, and the resistor $R_1$ may be different than the values of the inductor $L_{ac}$, the capacitor $C_{ac}$ and the resistor $R_{ac}$ of the AC filter 112 of FIG. 1.

Continuing on with the operation of the combined dynamic break and distortion filter 212, consider now the case where the inverter 108 provides power at the second chopping frequency. In this case, the combination of the inductor $L_1$ and the capacitor $C_1$ may allow current to flow from the input port 214 to the resistor $R_1$. Therefore, when the inverter controller 110 controls the inverter 108 to operate at the second chopping frequency, power may be dissipated in the resistor $R_1$. AC power that is received at the input port 214 from the inverter 108 operating at the second chopping frequency that is not dissipated in the resistor $R_1$, will substantially be available at the output port 216. This remaining power may be provided at the output port 216 at primarily the fundamental frequency.

As a non-limiting example, the first chopping frequency may be in the range of about 2 to 3 kHz and the second chopping frequency may be in the range of about 4 to 5 kHz. Furthermore, the fundamental frequency may be, for example, about 60 Hz when the power converter 101 is connected to the power grid 116 in North America or other regions or countries, or about 50 Hz when the power converter 101 is connected to the power grid 116 in Europe or other regions or countries.

In light of the description of the operation of the inverter controller 110, the inverter 108, and the combined dynamic break and distortion filter 212, the inverter 108 can be controlled differently when power must be delivered to the power grid 116 than when power delivery must be curtailed to the power grid 116 and instead dissipated at the power converter 101. If a condition occurs that requires the power converter 101 to not provide power to the power grid 116, such as an LVRT condition, the inverter controller 110 may receive a curtailment signal indicating that power provided to the power grid 116 should be curtailed. The received curtailment signal may be, for example, from a power utility company or otherwise an entity that controls or manages the power grid 116. In such a case, the switch $S_{grid}$ may be opened so that power does not flow to the grid coupling 114 and subsequently to the power grid 116. Additionally, the inverter controller 110 may control the inverter 108 to operate at the second chopping frequency based on the received curtailment signal. As a result of the inverter 108 operating at the second chopping frequency, power outputted by the inverter 108 may be dissipated at the resistor $R_1$.

Continuing on with the example, at some time subsequent to the inverter controller 110 switching to the second chopping frequency to dissipate power in the resistor $R_1$, it may be desirable to no longer dissipate power in the resistor $R_1$. In such a case, the inverter controller 110 may receive an end of curtailment signal and based upon receiving the end of curtailment signal, control the inverter 108 to operate with the first chopping frequency. By operating inverter 108 at the first chopping frequency, a reduced level of power may be dissipated at the resistor $R_1$. In addition to changing the chopping frequency of the inverter modulation signals, the end of curtailment signal may also cause the switch $S_{grid}$ to close, such that AC power can be provided from the inverter 108 to the power grid 116 via the coupling 114.

In one embodiment the curtailment signal may not be received by the inverter controller 110 from a utility or other entity that controls or manages the power grid 116. Instead currents and voltages measured within the power converter 101 or on the power grid 116 may provide an indication to the inverter controller 110 that it should change the chopping frequency.

In another embodiment the end of curtailment signal may not be received by the inverter controller 110 from a utility or other entity that controls or manages the power grid 116. Instead currents and voltages measured within the power converter 101 or on the power grid 116 may provide an indication to the inverter controller 110 that it should change the chopping frequency.

It should be noted that with the apparatus, systems and methods described above, power can be selectively dissipated within the power converter 101 without the addition of additional switches, active devices, or control hardware to the power converter 101.

In one aspect the methods disclosed may be implemented with conventional power converters by implementing software changes to the inverter controller such that the inverter controller can selectively toggle between generating inverter control signals with a first and second chopping frequency and by providing additional passive electronic elements to construct the combined dynamic break and distortion filter. The passive electronic elements may be discrete electronic parts.

Figure 3:
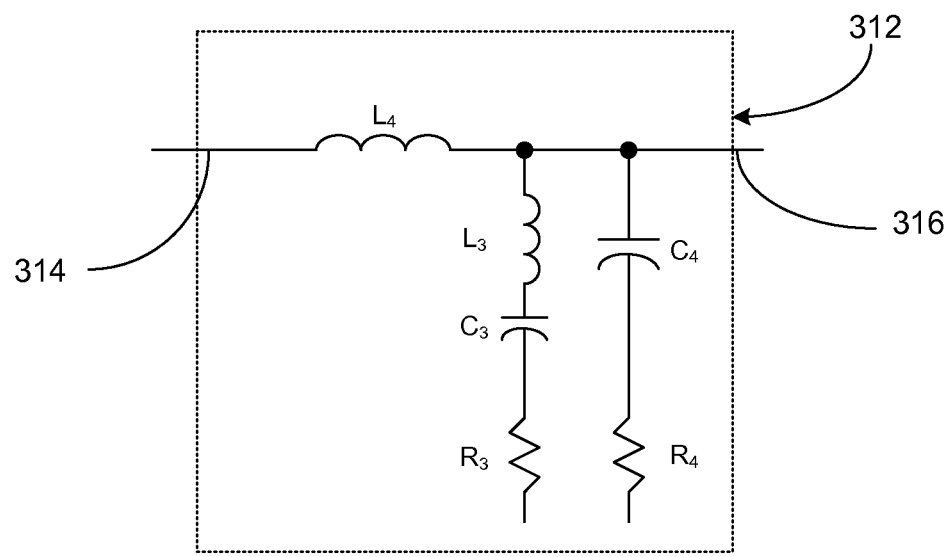
FIG. 3 is a circuit diagram representation of an example dynamic break and distortion filter according to another embodiment of the invention.

Referring now to FIG. 3, another example of a combined dynamic break and distortion filter 312 is described. As in the previous embodiment of FIG. 2, the combined dynamic break and distortion filter 312 can replace the AC filter 112 within the power converter 101 circuit topology of FIG. 1. The combined dynamic break and distortion filter 312 can include an inductor $L_3$, a capacitor $C_3$, and a resistor $R_3$. The inductor $L_3$, capacitor $C_3$, and resistor $R_3$ may be connected in series and further connected to an output port 316 of the combined dynamic break and distortion filter 312. The combined dynamic break and distortion filter 312 can further include a second inductor $L_4$, a second capacitor $C_4$, and a second resistor $R_4$. The second inductor $L_4$ can be electrically connected to both an input port 314 and the output port 316 of the combined dynamic break and distortion filter 312. The second capacitor $C_4$ can be connected to both the output port 316 and the second resistor $R_4$. In one embodiment the resistance of resistor $R_3$ is relatively greater than the resistance of the second resistor $R_4$.

The operation of the combined dynamic break and distortion filter 312 is similar to the operation of the combined dynamic break and distortion filter 212 of FIG. 2. Power from the inverter 108, having various spectral components, including power at the chopping frequency of the inverter 108, can be received by the combined dynamic break and distortion filter 312. The chopping frequency of the inverter 108 may be selectable between at least a first and second frequency. If a first chopping frequency is selected for the operation of the inverter 108 and therefore power is received at the combined dynamic break and distortion filter 312 input port 314 with power at the first chopping frequency, the associated current may be blocked by the combination of the inductor $L_3$ and the capacitor $C_3$. In other words, when power is received at the input port 314 that has been provided by the inverter 108 operating at the first chopping frequency, the combination of the inductor $L_3$ and the capacitor $C_3$ may operate as a filter to prevent substantial current from flowing to the resistor $R_3$. As a result, when the inverter controller 110 controls the inverter 108 to operate at the first chopping frequency to provide power to the combined dynamic break and distortion filter 312, the resistor $R_3$ may not substantially dissipate any power.

When the inverter 108 is operated at the first chopping frequency, the combined operation of the second inductor $L_4$, the second capacitor $C_4$, and the second resistor $R_4$ may be similar to that of inductor $L_{ac}$, a capacitor $C_{ac}$, and a resistor $R_{ac}$ of the AC filter 112 of the power converter 101 of FIG. 1. In other words, the function of the second inductor $L_4$, the second capacitor $C_4$, and the second resistor $R_4$ may provide smoothing of the power output from the inverter 108 and provide AC power at substantially a fundamental frequency. Furthermore, the relative values of the inductance of the second inductor $L_4$, the capacitance of second capacitor $C_4$, and resistance of second resistor $R_4$ may be selected to provide AC power at the output port 316 of the combined dynamic break and distortion filter 312 that does not substantially have any spectral components at the chopping frequency.

Continuing on with the operation of the combined dynamic break and distortion filter 312, consider now the case where the inverter 108 provides power at the second chopping frequency. In this case, the combination of the inductor $L_3$ and the capacitor $C_3$ may allow current to flow from the input port 314 to the resistor $R_3$. Therefore, when the inverter controller 110 controls the inverter 108 to operate at the second chopping frequency, power may be dissipated in the resistor $R_3$. AC power that is received at the input port 314 from the inverter 108 operating at the second chopping frequency that is not dissipated in the resistor $R_3$, will substantially be available at the output port 316. This remaining power may be provided at the output port 316 at primarily the fundamental frequency.

Similar to the combined dynamic break and distortion filter 212 of FIG. 2, the combined dynamic break and distortion filter 312 can therefore selectively dissipate power at the resistor $R_3$ depending on the spectral output of the inverter 108. The spectral output of the inverter 108 can be modified by selecting from two or more chopping frequencies for the operation of the inverter. Therefore the chopping frequency of the inverter 108 can be controlled and thereby, the amount of power dissipated in the power converter 101 can be controlled.

Figure 4:
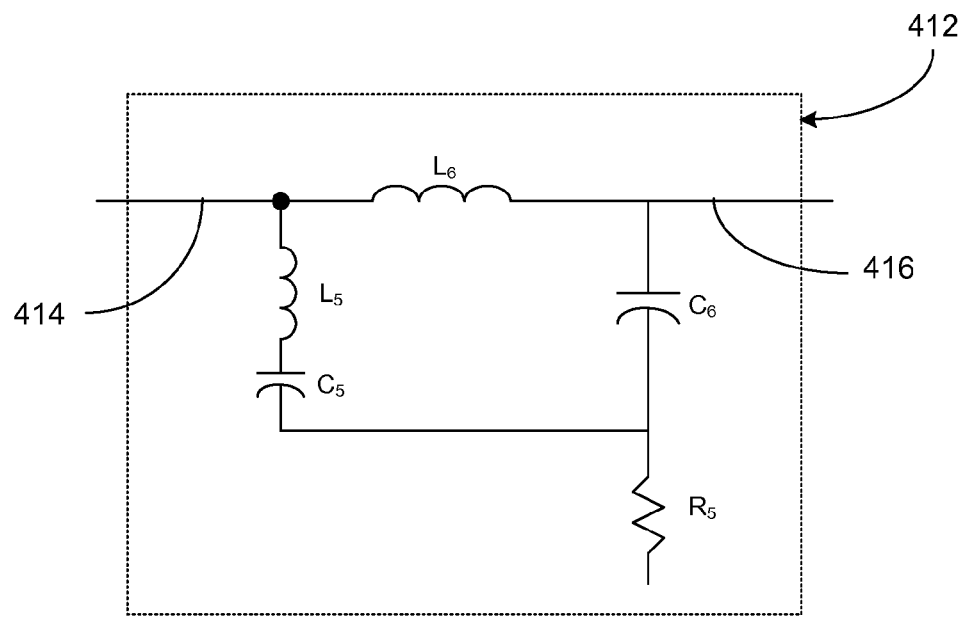
FIG. 4 is a circuit diagram representation of an example dynamic break and distortion filter according to yet another embodiment of the invention.

Referring now to FIG. 4, yet another example of a combined dynamic break and distortion filter 412 is described. As in the previous embodiments of FIGS. 2 and 3, the combined dynamic break and distortion filter 412 can replace the AC filter 112 within the power converter 101 circuit topology of FIG. 1. The combined dynamic break and distortion filter 412 can include an inductor $L_5$, a capacitor $C_5$, and a resistor $R_5$. The inductor $L_5$, the capacitor $C_5$, and the resistor $R_5$ may be connected in series and further connected to an input port 414 of the combined dynamic break and distortion filter 412. The combined dynamic break and distortion filter 412 can further include a second inductor $L_6$ and a second capacitor $C_6$. The second inductor $L_6$ can be electrically connected to both an input port 414 and the output port 416 of the combined dynamic break and distortion filter 412. The second capacitor C6 can be connected to both the output port 416 and the resistor $R_5$.

The operation of the combined dynamic break and distortion filter 412 is similar to the operation of the combined dynamic break and distortion filters 212 and 312 of FIGS. 2 and 3. Power from the inverter 108, having various spectral components, including power at the chopping frequency of the inverter 108, can be received by the combined dynamic break and distortion filter 412. The chopping frequency of the inverter 108 may be selectable between at least a first and second frequency. If a first chopping frequency is selected for the operation of the inverter 108 and therefore power is received at the combined dynamic break and distortion filter 412 input port 414 with power at the first chopping frequency, the associated current may be blocked by the combination of the inductor $L_5$ and the capacitor $C_5$. In other words, when power is received at the input port 414 that has been provided by the inverter 108 operating at the first chopping frequency, the combination of the inductor $L_5$ and the capacitor $C_5$ may operate as a filter to prevent substantial current from flowing to the resistor $R_5$. As a result, when the inverter controller 110 controls the inverter 108 to operate at the first chopping frequency to provide power to the combined dynamic break and distortion filter 412, the resistor $R_5$ may not substantially dissipate any power.

When the inverter 108 is operated at the first chopping frequency, the combined operation of the second inductor $L_6$ and the second capacitor $C_6$ in combination with the resistor $R_5$ may be similar to that of inductor $L_{ac}$, a capacitor $C_{ac}$, and a resistor $R_{ac}$ of the AC filter 112 of the power converter 101 of FIG. 1. In other words, the function of the second inductor $L_6$, the second capacitor C6, and the resistor R5 may provide smoothing of the power output from the inverter 108 and provide AC power at substantially a fundamental frequency. Furthermore, the relative values of the inductance of the second inductor $L_6$, the capacitance of second capacitor $C_6$, and resistance of resistor $R_5$ may be selected to provide AC power at the output port 416 of the combined dynamic break and distortion filter 412 that does not substantially have any spectral components at the chopping frequency.

Continuing on with the operation of the combined dynamic break and distortion filter 412, consider now the case where the inverter 108 provides power at the second chopping frequency. In this case, the combination of the inductor $L_5$ and the capacitor $C_5$ may allow current to flow from the input port 414 to the resistor $R_5$. Therefore, when the inverter controller 110 controls the inverter 108 to operate at the second chopping frequency, power may be dissipated in the resistor R5. AC power that is received at the input port 414 from the inverter 108 operating at the second chopping frequency that is not dissipated in the resistor $R_5$, will substantially be available at the output port 416. This remaining power may be provided at the output port 416 at primarily the fundamental frequency.

Similar to the previously described combined dynamic break and distortion filters 212 and 312 of FIGS. 2 and 3, the combined dynamic break and distortion filter 412 can therefore selectively dissipate power at the resistor $R_5$ depending on the spectral output of the inverter 108. The spectral output of the inverter 108 can be modified by selecting from two or more chopping frequencies for the operation of the inverter. Therefore the chopping frequency of the inverter 108 can be controlled and thereby, the amount of power dissipated in the power converter 101 can be controlled.

Figure 5:
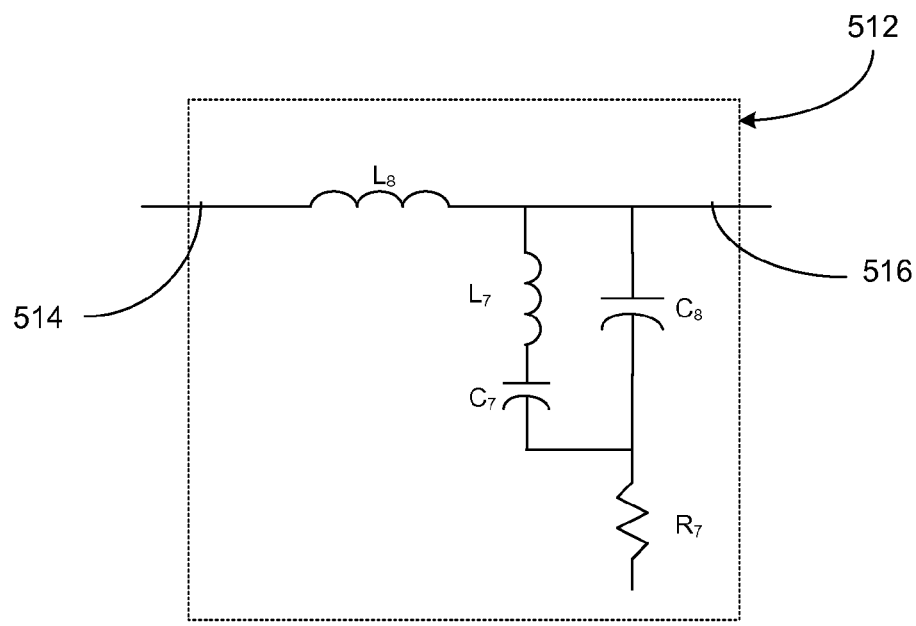
FIG. 5 is a circuit diagram representation of an example dynamic break and distortion filter according to yet a further embodiment of the invention.

Referring now to FIG. 5, yet a further example of a combined dynamic break and distortion filter 512 is described. As in the previous embodiments of FIGS. 2-4, the combined dynamic break and distortion filter 512 can replace the AC filter 112 within the power converter 101 circuit topology of FIG. 1. The combined dynamic break and distortion filter 512 can include an inductor $L_7$, a capacitor $C_7$, and a resistor $R_7$. The inductor $L_7$, capacitor $C_7$, and resistor $R_7$ may be connected in series and further connected to an output port 516 of the combined dynamic break and distortion filter 512. The combined dynamic break and distortion filter 512 can further include a second inductor $L_8$ and a second capacitor $C_8$. The second inductor $L_8$ can be electrically connected to both an input port 514 and the output port 516 of the combined dynamic break and distortion filter 512. The second capacitor $C_8$ can be connected to both the output port 516 and the resistor $R_7$.

The operation of the combined dynamic break and distortion filter 512 is similar to the operation of the combined dynamic break and distortion filters 212, 312, and 412 of FIGS. 2-4. Power from the inverter 108, having various spectral components, including power at the chopping frequency of the inverter 108, can be received by the combined dynamic break and distortion filter 512. The chopping frequency of the inverter 108 may be selectable between at least a first and second frequency. If a first chopping frequency is selected for the operation of the inverter 108 and therefore power is received at the combined dynamic break and distortion filter 512 input port 514 with power at the first chopping frequency, the associated current may be blocked by the combination of the inductor $L_7$ and the capacitor $C_7$. In other words, when power is received at the input port 514 that has been provided by the inverter 108 operating at the first chopping frequency, the combination of the inductor $L_7$ and the capacitor $C_7$ may operate as a filter to prevent substantial current from flowing to the resistor $R_7$. As a result, when the inverter controller 110 controls the inverter 108 to operate at the first chopping frequency to provide power to the combined dynamic break and distortion filter 512, the resistor $R_7$ may not substantially dissipate any power.

When the inverter 108 is operated at the first chopping frequency, the combined operation of the second inductor $L_8$ and the second capacitor $C_8$ in combination with the resistor $R_7$ may be similar to that of inductor $L_{ac}$, a capacitor $C_{ac}$, and a resistor $R_{ac}$ of the AC filter 112 of the power converter 101 of FIG. 1. In other words, the function of the second inductor $L_8$, the second capacitor $C_8$, and the resistor $R_7$ may provide smoothing of the power output from the inverter 108 and provide AC power at substantially a fundamental frequency. Furthermore, the relative values of the inductance of the second inductor $L_8$, the capacitance of second capacitor $C_8$, and resistance of resistor $R_7$ may be selected to provide AC power at the output port 516 of the combined dynamic break and distortion filter 512 that does not substantially have any spectral components at the chopping frequency.

Continuing on with the operation of the combined dynamic break and distortion filter 512, consider now the case where the inverter 108 provides power at the second chopping frequency. In this case, the combination of the inductor $L_7$ and the capacitor $C_7$ may allow current to flow from the input port 514 to the resistor $R_7$. Therefore, when the inverter controller 110 controls the inverter 108 to operate at the second chopping frequency, power may be dissipated in the resistor $R_7$. AC power that is received at the input port 514 from the inverter 108 operating at the second chopping frequency that is not dissipated in the resistor $R_7$, will substantially be available at the output port 516. This remaining power may be provided at the output port 516 at primarily the fundamental frequency.

Similar to the previously described combined dynamic break and distortion filters 212, 312, and 412 of FIGS. 2-4, the combined dynamic break and distortion filter 512 can therefore selectively dissipate power at the resistor $R_7$ depending on the spectral output of the inverter 108. The spectral output of the inverter 108 can be modified by selecting from two or more chopping frequencies for the operation of the inverter. Therefore the chopping frequency of the inverter 108 can be controlled and thereby, the amount of power dissipated in the power converter 101 can be controlled.

It should be noted, that the circuit topologies of the various embodiments of combined dynamic break and distortion filters 212, 312, 412, and 512 may be modified in various ways in accordance with certain embodiments of the invention. For example, in certain embodiments, one or more circuit components may be eliminated or substituted with equivalent or nearly equivalent circuit elements. Additionally, in other embodiments, other circuit elements may be added to in the combined dynamic break and distortion filters 212, 312, 412, and 512.

Figure 6:
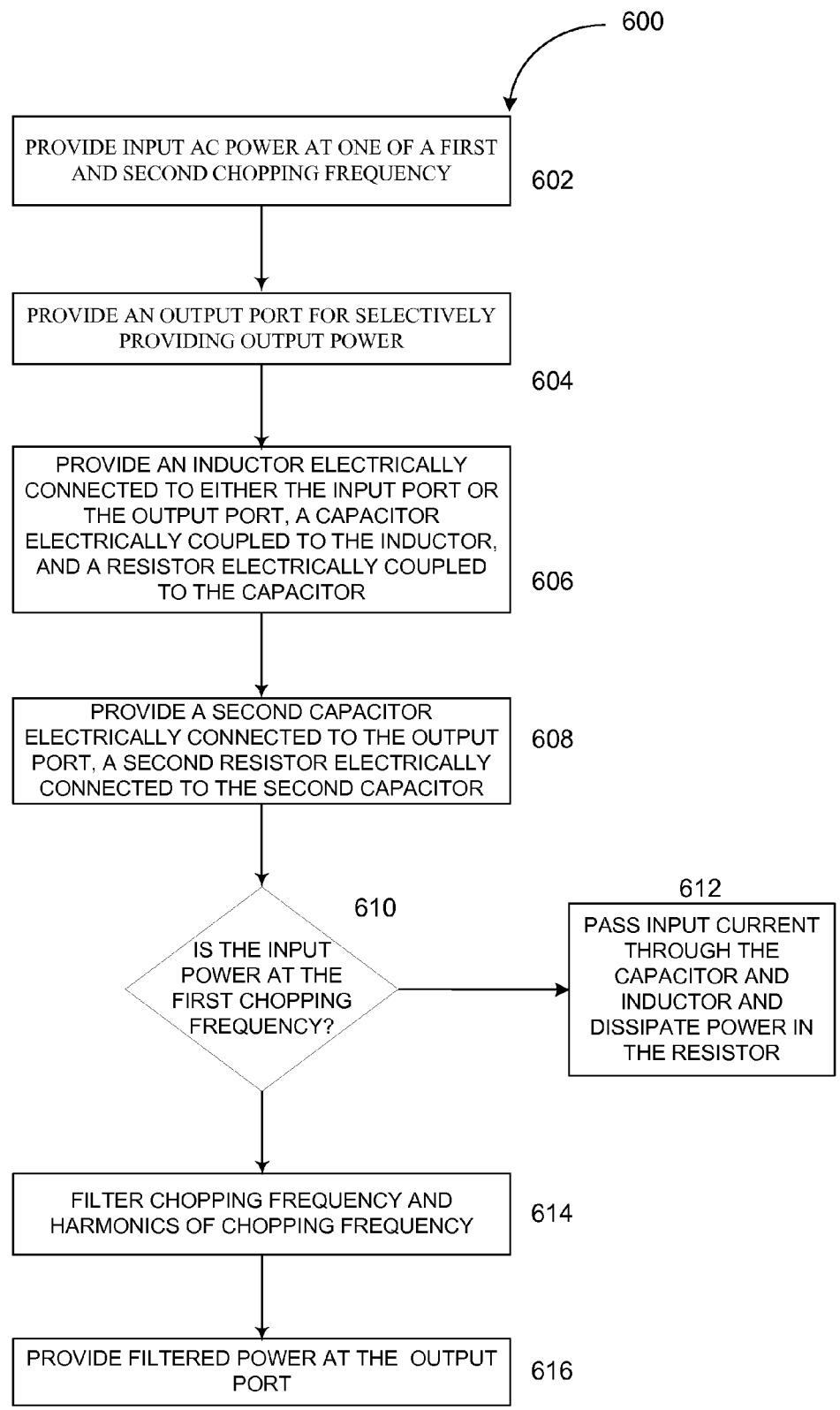
FIG. 6 is a flow diagram of an example method to provide power from the power system of FIG. 1 according to an embodiment of the invention.

Referring now to FIG. 6, an example method 600 of selectively dissipating power in a power converter. The method 600 can be implemented using some or all of the circuits, apparatus, signals, and systems as disclosed in reference to FIGS. 1-5. At block 602, AC power is provided at one of a first and second chopping frequency. In other words, the inverter 108 of FIG. 1 can be operated at one of the first or second chopping frequency, such that power from the inverter with spectral components at the corresponding chopping frequency are provided to an input port, such as 214 in FIG. 2, of the combined dynamic break and distortion filter 212. At block 604, an output port is provided for selectively providing output power. For example, output power can be selectively provided at output port 216 of the combined dynamic break and distortion filter 212. At block 606, an inductor electrically connected to either the input port or the output port, a capacitor electrically connected to the inductor, and a resistor electrically connected to the capacitor are provided. The second inductor $L_2$, the second capacitor $C_2$ and the second resistor $R_2$ of combined dynamic break and distortion filter 212 of FIG. 2 are examples of the inductor, the capacitor, and the resistor of block 606. At block 608, a second capacitor electrically connected to the output port and a second resistor electrically connected to the second capacitor are provided. At block 610 it is determined if the power at the input port is at the first chopping frequency. If the power at the input port is at the first chopping frequency, then the chopping frequency, as well as, harmonics of the chopping frequency are filtered at block 614 to provide power at a fundamental frequency and power is provided at the output port at block 616. On the other hand, if it is determined that the input power at the input port is not at the first chopping frequency at block 610, then current is passed through the capacitor and inductor and power is dissipated in the resistor at block 612.

It should be noted, that the method 600 may be modified in various ways in accordance with certain embodiments of the invention. For example, one or more operations of method 600 may be eliminated or executed out of order in other embodiments of the invention. Additionally, other operations may be added to method 600 in accordance with other embodiments of the invention.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A system comprising:
   a power source providing direct current (DC) power;
   a switch; and
   a power converter having an input coupled to the power source and an output coupled to the switch, the power converter comprising:
      an inverter for converting the DC power to alternating current (AC) power with a first chopping frequency when the switch is configured to couple the power converter to an electrical grid, and with a second chopping frequency when the switch is configured to decouple the power converter from the electrical grid; and
      a combined dynamic break and distortion filter comprising:
         an input port receiving the AC power from the inverter; and
         a series combination of an inductor, a capacitor, and a resistor, the series combination having one end electrically coupled to the input port and an opposing end connected to ground, the inductor and the capacitor operative as a filter to block current flow through the resistor when the AC power has the first chopping frequency and to allow current flow through the resistor when the AC power has the second chopping frequency, wherein the current flow through the resistor dissipates the AC power with the second chopping frequency in the resistor.

2. The system of claim 1, further comprising a smoothing filter for filtering the AC power provided by the inverter with the first chopping frequency into AC power at a fundamental frequency.

3. The system of claim 1, wherein the first chopping frequency is between 2 and 4 kilo-Hertz (kHz).

4. The system of claim 1, wherein the second chopping frequency is between 4 and 6 kHz.

5. An apparatus comprising:
   an inverter selectively providing alternating current (AC) power at one of a first chopping frequency or a second chopping frequency; and
   a combined dynamic break and distortion filter comprising:
      an input port receiving the AC power from the inverter; and
      a series combination of a first inductor, a first capacitor, and a first resistor, the series combination having one end electrically coupled to the input port and an opposing end connected to ground, the first inductor and the first capacitor operative as a filter to block current flow through the first resistor when the AC power has the first chopping frequency and to allow current flow through the first resistor when the AC power has the second chopping frequency, wherein the current flow through the first resistor dissipates the AC power with the second chopping frequency in the first resistor.

6. The apparatus of claim 5, further comprising a smoothing filter for filtering the AC power provided by the inverter with the first chopping frequency and producing AC power at a fundamental frequency for coupling into an electrical grid.

7. The apparatus of claim 6, wherein the smoothing filter comprises a second resistor that is less electrically resistive than the first resistor.

8. The apparatus of claim 6, further comprising a second inductor having one end connected to the input port of the combined dynamic break and distortion filter.

9. The apparatus of claim 5, wherein the first inductor has an inductance between 100 and 300 micro-Henries (µH).

10. The apparatus of claim 5, wherein the first capacitor has a capacitance between 100 and 1000 micro-Farads (µF).

11. A method comprising:
providing input power via an input port at one of a first chopping frequency or a second chopping frequency;
selectively providing output power via an output port;
providing a series combination of a first inductor, a first capacitor, and a first resistor, the series combination having one end electrically coupled to the input port and an opposing end connected to ground; and
passing current through the first inductor and the first capacitor into the first resistor when the input power has the second chopping frequency, wherein the current flow through the first resistor dissipates the input power with the second chopping frequency in the first resistor.

12. The method of claim 11, further providing a second capacitor electrically connected to both the output port and a second resistor.

13. The method of claim 12, wherein the second capacitor substantially passes power at harmonics of a fundamental frequency, such that the power at the harmonics of the fundamental frequency is dissipated in the second resistor.

14. The method of claim 11, further providing a second inductor for smoothing the input power.

\* \* \* \* \*